(12) United States Patent
Fan et al.

(10) Patent No.: US 12,002,989 B2
(45) Date of Patent: Jun. 4, 2024

(54) SEPARATOR, LITHIUM-ION BATTERY, AND ELECTRONIC DEVICE

(71) Applicant: Ningde Amperex Technology Limited, Ningde (CN)

(72) Inventors: Xiaohe Fan, Ningde (CN); ZengBin Wei, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 595 days.

(21) Appl. No.: 17/202,732

(22) Filed: Mar. 16, 2021

(65) Prior Publication Data

US 2021/0305660 A1  Sep. 30, 2021

Related U.S. Application Data

(63) Continuation-in-part of application No. PCT/CN2020/082433, filed on Mar. 31, 2020.

(51) Int. Cl.
*H01M 50/451* (2021.01)
*H01M 10/0525* (2010.01)

(52) U.S. Cl.
CPC ..... *H01M 50/451* (2021.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2015/0056490 A1* | 2/2015 | Shimizu | ............. | H01M 50/489 429/144 |
| 2015/0333309 A1* | 11/2015 | Lai | .................... | H01M 10/0525 429/145 |
| 2016/0380250 A1* | 12/2016 | Umeyama | .......... | H01M 50/454 429/145 |

FOREIGN PATENT DOCUMENTS

| | | |
|---|---|---|
| CN | 103956448 A | 7/2014 |
| CN | 104852008 A | 8/2015 |
| CN | 105765761 A | 7/2016 |
| CN | 107403904 A | 11/2017 |
| CN | 107431169 A | 12/2017 |
| CN | 108028379 A | 5/2018 |
| CN | 108493387 A | 9/2018 |
| CN | 208460853 U | 2/2019 |
| CN | 110112353 A | 8/2019 |
| CN | 110557970 A | 12/2019 |
| CN | 110635088 A | 12/2019 |
| JP | 2010050076 A | 3/2010 |
| WO | 2018027652 A1 | 2/2018 |

OTHER PUBLICATIONS

Office Action dated Jan. 5, 2023, in corresponding Chinese Application No. 202080032891.2, 16 pages.
Office Action dated Aug. 17, 2023, in corresponding Chinese Application No. 202080032891.2, 14 pages.
(Continued)

*Primary Examiner* — Carlos Barcena
(74) *Attorney, Agent, or Firm* — Maier & Maier, PLLC

(57) ABSTRACT

A separator includes a porous substrate and a hybrid coating layer disposed on a surface of the porous substrate. The hybrid coating layer includes a plurality of polymer particles and a binder. Each polymer particle includes a shell and a cavity defined in the shell. The polymer particle can swell and damage when comes in contact with an electrolyte.

18 Claims, 10 Drawing Sheets

(56) References Cited

OTHER PUBLICATIONS

Examination Report dated Dec. 30, 2022, in corresponding Indian Application No. 202217056858, 6 pages.
Extended European Search Report dated Mar. 16, 2022, in corresponding European Application No. EP 20864281.9, 10 pages.

* cited by examiner

SEPARATOR, LITHIUM-ION BATTERY, AND ELECTRONIC DEVICE

CROSS REFERENCE TO THE RELATED APPLICATIONS

This application is a continuation-in-part under 35 U.S.C. § 120 of international patent application PCT/CN2020/082433 filed on Mar. 31, 2020.

TECHNICAL FIELD

The disclosure relates to a separator of a battery, and more particularly, to a separator, a lithium-ion battery including the separator, and an electronic device including the lithium-ion battery.

BACKGROUND

Lithium-ion batteries have been widely used in consuming electronics because of high energy density, high operating voltage, low self-discharge, small size, and small weight. With rapid development of electric vehicles and mobile electronic devices, people have increasingly higher requirements for performance of the lithium-ion battery, especially the energy density and performance over charge-discharge cycles.

In related arts, a separator with high bonding force may be applied to tightly bond a positive electrode plate and negative electrode plate together. Thus, the adhesion performance at an interface between the separator and the electrode plates is ensured. Expansion and deformation of a battery cell is avoided. A charge-discharge cycling performance of the battery is also ensured. However, the separator with high bonding force cannot improve a dynamic performance or a low-temperature cycling performance of the lithium battery.

SUMMARY

To overcome the above shortcomings, a separator capable of improving the dynamic performance or the low-temperature cycling performance of the lithium-ion battery, is needed.

A lithium-ion battery including the electrode assembly is also needed.

An electronic device including the lithium-ion battery is also needed.

The present disclosure provides a separator including a porous substrate and a hybrid coating layer disposed on a surface of the porous substrate. The hybrid coating layer includes a plurality of polymer particles and a binder. Each polymer particle includes a shell and a cavity defined in the shell. The each polymer particle swells and damages when comes in contact with an electrolyte.

Since the each polymer particle has a certain diameter, gaps are formed between the separator and the electrode plates. On one hand, the electrolyte may fully infiltrate the electrode plates during an electrolyte injection process. On the other hand, after the electrolyte injection process, the each polymer particle swells and damages since the each polymer particle has poor resistance to the electrolyte. The gaps in a main region disappear under the heat pressing condition during the subsequent formation procedure of the lithium-ion battery, thereby avoiding a volume energy density loss of the lithium-ion battery. The gaps in a corner region still exist, which leave spaces for the expansion of the electrode plates during charge-discharge cycling. Thus, the corner region extrusion suffers from less squeezing force. Discontinuous distribution of the electrolyte in the corner region is avoided, thereby ensuring unblocked ion channels. Therefore, a charge-discharge cycling performance of the lithium-ion battery is improved.

In some embodiment, the hybrid coating layer further includes an inorganic ceramic particle.

In some embodiment, the separator further includes a ceramic coating layer coated on at least one surface of the porous substrate. The hybrid coating layer is disposed on a surface of the ceramic coating layer and/or a surface of the porous substrate not coated with the ceramic coating layer.

In some embodiment, a particle diameter D50 of the each polymer particle is in a range of 3 μm to 40 μm. If the particle diameter D50 of the each polymer particle is less than 3 μm, sufficient gaps are less likely to be formed between the separator and the electrode plates. The problem of discontinuous distribution of the electrolyte in the corner region cannot be avoided. If the particle diameter D50 of the each polymer particle is greater than 40 μm, the adhesion performance of the hybrid coating layer is affected.

In some embodiment, a thickness of the shell of the each polymer particle is in a range of 0.5 μm to 6 μm. If the thickness of the shell of the each polymer particle is less than 0.5 μm, the each polymer particle easily damages. Thus, the electrolyte cannot fully infiltrate the electrode plates, and the charge-discharge cycling performance of the lithium-ion battery cannot be improved. If the thickness of the shell of the each polymer particle is greater than 6 μm, the each polymer particle is difficult to swell and damage in the electrolyte. On one hand, the energy density of the lithium-ion battery may be lost. On the other hand, the adhesion performance of the hybrid coating layer is affected.

In some embodiment, the each polymer particle has a swelling degree of 60% to 200% in the electrolyte. If the swelling degree of the each polymer particle is less than 60%, the each polymer particle is difficult to swell and break in the electrolyte, which increases an overall thickness of the lithium-ion battery and reduces the volume energy density of the lithium-ion battery. On the other hand, the adhesion performance of the hybrid coating layer is affected. If the swelling degree of the each polymer particle is greater than 200%, the each polymer particle is easily dissolved in the electrolyte, which increases viscosity of the electrolyte and reduces transmission velocity of ions in the electrolyte. The composition of the polymer particle dissolved in the electrolyte also increases the probability of side effects or reactions happened during the charge and discharge process, resulting in a decrease of the charge-discharge cycling performance of the lithium-ion battery.

In some embodiment, the shell of the each polymer particle is a homopolymer or a copolymer. Polymerization monomers of the shell of the each polymer particle are selected from the group consisting of methyl acrylate, methyl methacrylate, vinyl methacrylate, ethylene glycol dimethacrylate, acrylonitrile, and any combination thereof.

In some embodiment, an amount of the plurality of polymer particles is 10 wt. % to 80 wt. % based on a total weight of the hybrid coating layer. An amount of the binder is 20 wt. % to 90 wt. % based on the total weight of the hybrid coating layer.

In some embodiment, the binder includes a first binder and a second binder. A mass ratio of the first binder to the second binder is (85%-95%):(5%-15%). A particle diameter D50 of the first binder is in a range of 0.3 μm to 0.5 μm.

In some embodiment, the first binder has a core and a shell surrounding the core. The core and the shell of the first binder are made of homopolymers or copolymers. Polymerization monomers of the core are selected from the group consisting of acrylate monomers, aromatic monovinyl compounds, acid anhydride, and any combination thereof. Polymerization monomers of the shell of the first binder are selected from the group consisting of acrylate monomers, aromatic monovinyl compounds, nitrile vinyl compounds, and any combination thereof.

In some embodiment, the first binder is made of a homopolymer or a copolymer. Polymerization monomers of the first binder are selected from the group consisting of acrylic acid, acrylate, butadiene, styrene, acrylonitrile, ethylene, chlorostyrene, fluorostyrene, propylene, and any combination thereof.

The present disclosure further provides a lithium-ion battery including an electrolyte and an electrode assembly. The electrode assembly includes a separator including a porous substrate and a hybrid coating layer disposed on a surface of the porous substrate. The hybrid coating layer includes a polymer and a binder. The polymer is formed by a plurality of polymer particles and the plurality of polymer particles swell and damage when comes in contact with the electrolyte. The polymer particle comprises a shell and a cavity defined in the shell.

The present disclosure further provides an electronic device including the above lithium-ion battery.

BRIEF DESCRIPTION OF THE DRAWINGS

Implementations of the present disclosure will now be described, by way of embodiments, with reference to the above figures.

DETAILED DESCRIPTION

Implementations of the disclosure will now be described, by way of embodiments only, with reference to the drawings. It should be noted that the embodiments and the features of the present disclosure can be combined without conflict. Specific details are set forth in the following description to make the present disclosure to be fully understand. The embodiments are only portions of, but not all the embodiments of the present disclosure. Based on the embodiments of the present disclosure, other embodiments obtained by a person of ordinary skill in the art without creative efforts shall be within the scope of the present disclosure.

Unless defined otherwise, all technical and scientific terms used herein have the same meaning as commonly understood by one of ordinary skill in the art. The terms used herein in the specification of the present disclosure are only for describing the embodiments, and are not intended to limit the present disclosure. The term "and/or" as used herein includes any combination of one or more related items.

In the embodiments of the present disclosure, for descriptive convenience but not in limitation of the present disclosure, the term "connection" used in the specification and claims of the present disclosure is not limited to physical or mechanical connection, no matter direct connection or indirect connection. The terms of "Up", "down", "above", "below", "left", "right", etc., are only used to indicate the relative position relationship. When the absolute position of the described element changes, the relative position relationship correspondingly changes.

Figure 1A:
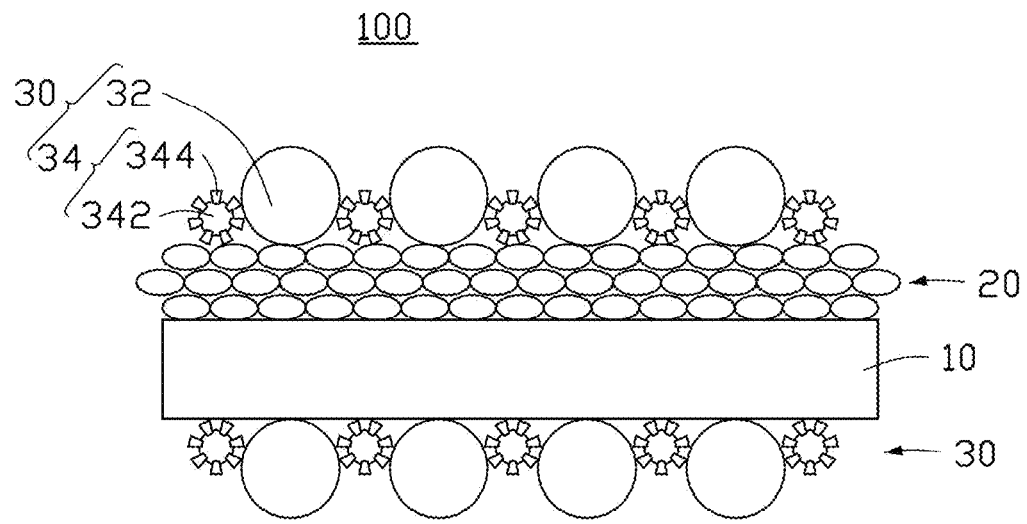
FIG. 1A is a perspective view of an embodiment of a separator according to the present disclosure, showing undamaged polymer particles.
Figure 1B:
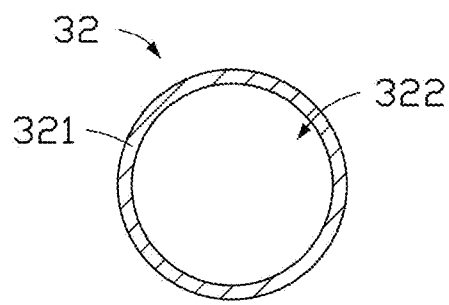
FIG. 1B is a cross-sectional view of the polymer particle of FIG. 1A.

Referring to FIG. 1A, an embodiment of a separator 100 is provided according to the present disclosure. The separator 100 includes a porous substrate 10 and a hybrid coating layer 30. The hybrid coating layer 30 is disposed on a surface of the porous substrate 10. The hybrid coating layer 30 includes a plurality of polymer particles 32 and a binder 34. Referring to FIG. 11B, the polymer particle 32 is hollow, which includes a shell 321 and a cavity 322 defined in the shell 321. The polymer particle 32 can swell and damage when comes in contact with an electrolyte.

As shown in FIG. 1A, in one embodiment, the separator 100 further includes a ceramic coating layer 20 coated on at least one surface of the porous substrate 10. The hybrid coating layer 30 is disposed on a surface of the ceramic coating layer 20 and/or a surface of the porous substrate 10 not coated with the ceramic coating layer 20. For example, the ceramic coating layer 20 is disposed on one surface of the porous substrate 10. Two hybrid coating layers 30 are included. One of the two hybrid coating layers 30 is disposed on the surface of the ceramic coating layer 20, and the other one of the two hybrid coating layers 30 is disposed on the surface of the porous substrate 10 not coated with the ceramic coating layer 20. The ceramic coating layer 20 improves resistance to heating and puncturing of the separator 100.

Figure 2A:
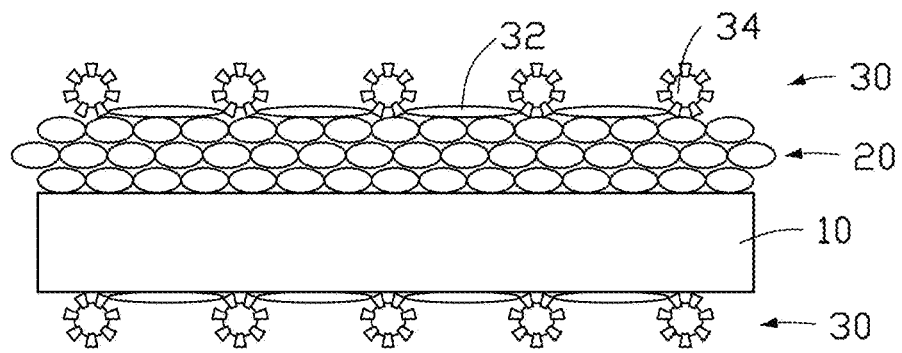
FIG. 2A is a perspective view showing the polymer particles in the separator of FIG. 1A damaged into pie shapes.
Figure 2B:
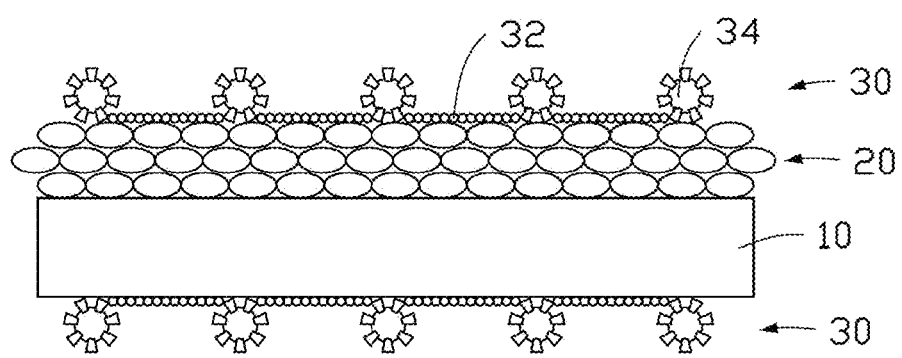
FIG. 2B is a perspective view showing the polymer particles in the separator of FIG. 1A damaged into ring shapes.

Referring to FIG. 2A, since the polymer particle 32 has inner hollow structure, the polymer particle 32 when damaging may be shaped like pies lying on the surface of the porous substrate 10 and/or the ceramic coating layer 20. Referring to FIG. 2B, the polymer particle 32 may have a more extensive damaged degree (that is, the polymer particles 32 damage into pieces), and shaped like continuous rings lying on the surface of the porous substrate 10 and/or the ceramic coating layer 20 after damaging. The polymer particle 32 may also be shaped like rings of dots lying on the surface of the porous substrate 10 and/or the ceramic coating layer 20 after damaging.

In related arts, the separator and the electrode plates being bonded together may leave only small gaps between the separator and the electrode plates. On one hand, it is difficult for an electrolyte to fully infiltrate the electrode plates. On the other hand, since the negative electrode plate may undergo expansion and deformation during the charge-discharge cycling of the lithium-ion battery, a corner region of the electrode plate may be squeezed, thereby keeping the electrolyte out of the corner region. The electrolyte is discontinuously distributed in the corner region, and ion channels are thus blocked. Therefore, purple spots of lithium deposition are generated in the corner region during the charge-discharge cycling, and the dynamic performance or the low-temperature cycling performance of the lithium-ion battery is thus reduced.

The separator 100 of the present disclosure includes the hybrid coating layer 30, and the hybrid coating layer 30 includes the polymer particles 32 and the binder 34. The binder 34 may bond the polymer particles 32 together, and further adhere the hybrid coating layer 30 to the surface of the porous substrate 10 and/or the ceramic coating layer 20. Since the polymer particles 32 have a certain diameter, gaps are formed between the separator 100 and the electrode plates. On one hand, the electrolyte may fully infiltrate the electrode plates during an electrolyte injection process.

On the other hand, after the electrolyte injection process, the polymer particle 32 can swell and damage when comes in contact with the electrolyte since the polymer particles 32 have poor resistance to the electrolyte. The gaps in a main region disappear under the heat pressing condition during the subsequent formation procedure of the lithium-ion battery, thereby avoiding a volume energy density loss of the lithium-ion battery. The gaps in a corner region still exist, which leave spaces for the expansion of the electrode plates during charge-discharge cycling. Thus, the corner region extrusion suffers from less squeezing force. Discontinuous distribution of the electrolyte in the corner region is avoided, thereby ensuring unblocked ion channels. Furthermore, compared with the polymer particles 32 shaped like pies lying on the surface of the porous substrate 10 and/or the ceramic coating layer 20 after damaging, when the polymer particles 32 are shaped like rings lying on the surface of the porous substrate 10 and/or the ceramic coating layer 20 after damaging, the ion channels in the separator 100 are as far as possible left unblocked, thereby avoiding degradation of the charge-discharge cycling performance of the lithium-ion battery.

Figure 3:
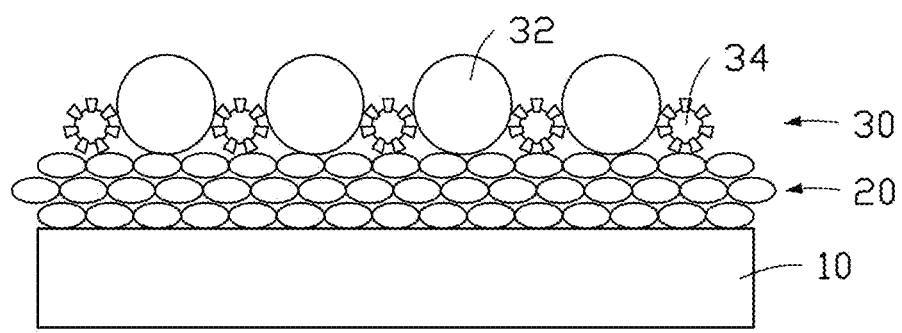
FIG. 3 is a perspective view of another embodiment of a separator according to the present disclosure.

Referring to FIG. 3, another embodiment of a separator 200 is provided according to the present disclosure. The difference between the separator 200 and the separator 100 is that the separator 200 includes only one hybrid coating layer 30, which is disposed on the surface of the ceramic coating layer 20.

Figure 4:
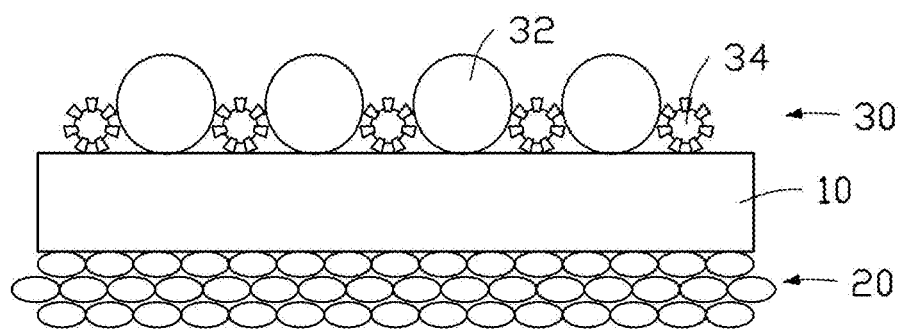
FIG. 4 is a perspective view of yet another embodiment of a separator according to the present disclosure.

Referring to FIG. 4, yet another embodiment of a separator 300 is provided according to the present disclosure. The difference between the separator 300 and the separator 100 is that the separator 300 includes only one hybrid coating layer 30, which is disposed on the surface of the porous substrate 10 not coated with the ceramic coating layer 20.

Figure 5:
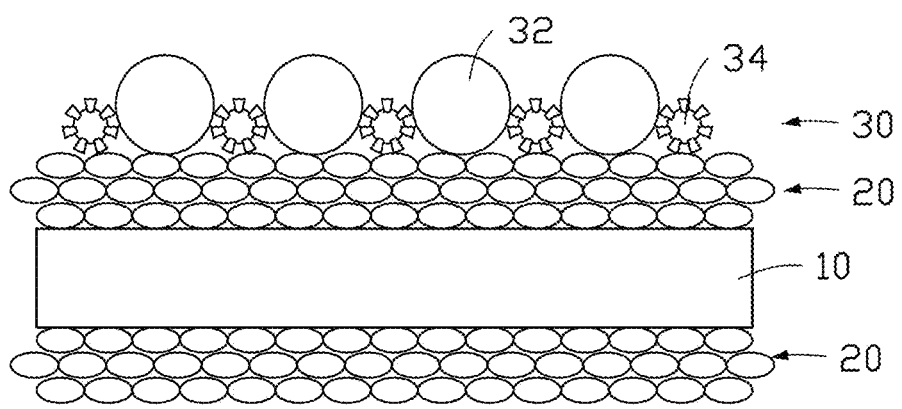
FIG. 5 is a perspective view of yet another embodiment of a separator according to the present disclosure.

Referring to FIG. 5, yet another embodiment of a separator 400 is provided according to the present disclosure. The difference between the separator 400 and the separator 100 is that the separator 400 includes two ceramic coatings layer 20, which are disposed on two opposite surfaces of the porous substrate 10. Only one hybrid coating layer 30 is included, which is disposed on a surface of one of the two ceramic coatings layer 20.

Figure 6:
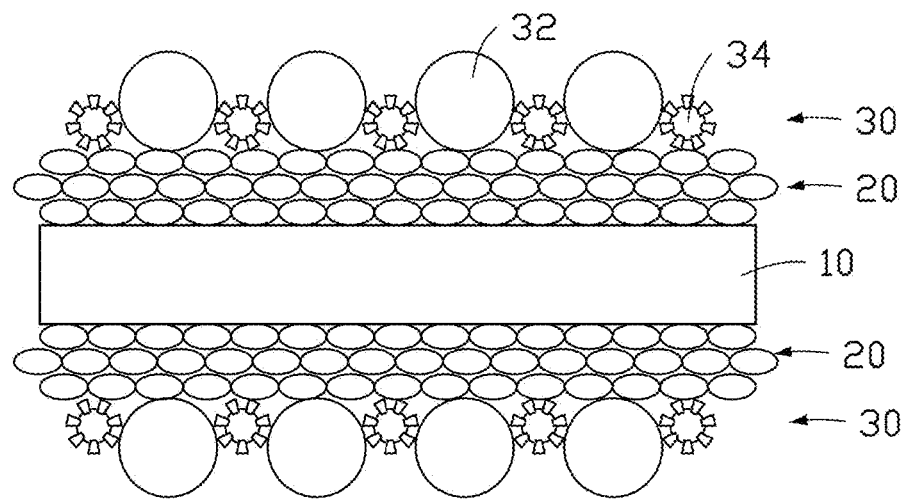
FIG. 6 is a perspective view of yet another embodiment of a separator according to the present disclosure.

Referring to FIG. 6, yet another embodiment of a separator 500 is provided according to the present disclosure. The difference between the separator 500 and the separator 100 is that the separator 500 includes two ceramic coating layers 20, which are disposed on the two opposite surfaces of the porous substrate 10. The two hybrid coating layers 30 are disposed on surfaces of the two ceramic coatings layer 20.

In the embodiment, the porous substrate 10 may be made of a material selected from the group consisting of polyethylene (PE), polypropylene (PP), polyethylene terephthalate (PET), and any combination thereof. The porous substrate 10 may be single-layered or multi-layered having composite materials. A thickness of the porous substrate 10 may be in a range of 3 µm to 20 µm.

In the embodiment, inorganic ceramic particles in the ceramic coating layer 20 include at least one of alumina, boehmite, barium sulfate, titanium dioxide, and magnesium hydroxide. A thickness of the ceramic coating layer 20 may be in a range of 0.5 µm to 6 µm.

Figure 7:
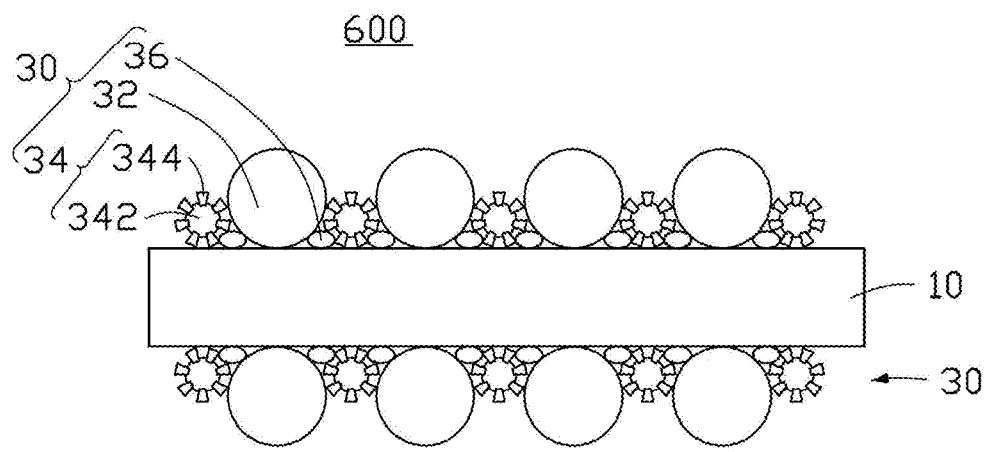
FIG. 7 is a perspective view of other embodiments of a separator according to the present disclosure.

Referring to FIG. 7, another embodiment of the present disclosure further provides a separator 600. The difference between the separator 600 and the separator 100 is that the separator 600 does not include any ceramic coating layer. The hybrid coating layer 30 further includes inorganic ceramic particles 36. The inorganic ceramic particles 36 of the hybrid coating layer 30 include at least one of alumina, boehmite, barium sulfate, titanium dioxide, and magnesium hydroxide. By adding the inorganic ceramic particles 36 in the hybrid coating layer 30, the resistance to heating and puncturing of the separator 600 is also improved.

In the embodiment, a thickness of the shell 321 of the polymer particle 32 is in a range of 0.5 µm to 6 µm. If the thickness of the shell 321 of the polymer particle 32 is less than 0.5 µm, the polymer particle 32 can easily damage, and the gap cannot be formed between the separator 100 and the electrode plates. Thus, the electrolyte cannot fully infiltrate the electrode plates, and the charge-discharge cycling performance of the lithium-ion battery cannot be improved. Furthermore, because no gap is formed in the corner region, purple spots of lithium deposition in the corner region cannot be avoided. If the thickness of the shell 321 of the polymer particle 32 is greater than 6 µm, the polymer particles 32 are difficult to swell and damage when comes in contact with the electrolyte. On one hand, the energy density of the lithium-ion battery may be lost. On the other hand, the adhesion performance of the hybrid coating layer 30 is affected, thereby affecting the charge-discharge cycling performance of the lithium-ion battery.

A particle diameter D50 of the polymer particle 32 is in a range of 3 µm to 40 µm. If the particle diameter D50 of the polymer particle 32 is less than 3 µm, sufficient gaps are less likely to be formed between the separator 100 and the electrode plates. The problem of discontinuous distribution of the electrolyte in the corner region cannot be avoided. If the particle diameter D50 of the polymer particle 32 is greater than 40 µm, the adhesion performance of the hybrid coating layer 30 is affected, thereby affecting the charge-discharge cycling performance of the lithium-ion battery.

A swelling degree of the polymer particles 32 in the electrolyte is in a range of 60% to 200%. The swelling degree is defined as a ratio between a difference between a weight of the polymer particles 32 after swelling and a weight of the polymer particles 32 before the swelling with respect to the weight of the polymer particles 32 before the swelling. Specifically, an initial weight of the polymer particles 32 is $W_0$. Then, the polymer particles 32 are placed in the electrolyte, and kept at 85 degrees Celsius for 24 hours. The weight of the polymer particles 32 after the swelling is Wt. The swelling degree of the polymer particles 32 in the electrolyte is calculated according to a function of:

$$\text{Swelling degree} = \frac{w_t - w_0}{w_0} \times 100\%$$

If the swelling degree of the polymer particles 32 is less than 60%, the polymer particles 32 are difficult to swell and damage when comes in contact with the electrolyte, which increases an overall thickness of the lithium-ion battery and reduces the volume energy density of the lithium-ion battery. On the other hand, the adhesion performance of the hybrid coating layer 30 is affected, thereby affecting the charge-discharge cycling performance of the lithium-ion battery. If the swelling degree of the polymer particles 32 is greater than 200%, the polymer particles 32 are easily dissolved in the electrolyte, which increases viscosity of the electrolyte and reduces transmission velocity of ions in the electrolyte. The composition of the polymer particles 32 dissolved in the electrolyte also increases the probability of side effects or reactions happened during the charge and discharge process, resulting in a decrease of the charge-discharge cycling performance of the lithium-ion battery.

An amount of the polymer particles 32 is 10 wt. % to 80 wt. % based on a total weight of the hybrid coating layer 30. An amount of the binder 34 is 20 wt. % to 90 wt. % based on the total weight of the hybrid coating layer 30. If the amount of the polymer particles 32 is less than 10 wt. %, the quantity of the polymer particles 32 is too small, which are difficult to form sufficient gaps in the corner region. If the amount of the polymer particles 32 are greater than 80 wt. %, the quantity of the binder 34 is too small, which affects the adhesion performance of the hybrid coating layer 30.

In the embodiment, the shell 321 of the polymer particle 32 is made of a homopolymer or a copolymer. Polymerization monomers of the shell 321 of the polymer particle 32 are selected from the group consisting of methyl acrylate (MA), methyl methacrylate (MMA), vinyl methacrylate (VMA), ethylene glycol dimethacrylate (EGDMA), and acrylonitrile (ACN), and any combination thereof. The material of the shell 321 of the polymer particle 32 depends on the type of the polymerization monomers. The material of the shell 321 of the polymer particle 32 in return affects the swelling degree of the polymer particle 32 in the electrolyte.

As shown in FIG. 1A, in the embodiment, the binder 34 includes a first binder 342 and a second binder 344. A mass ratio of the first binder 342 to the second binder 344 is (85%-95%):(5%-15%). The particle diameter D50 of the first binder 342 is in a range of 0.3 μm to 5 μm.

Figure 1C:
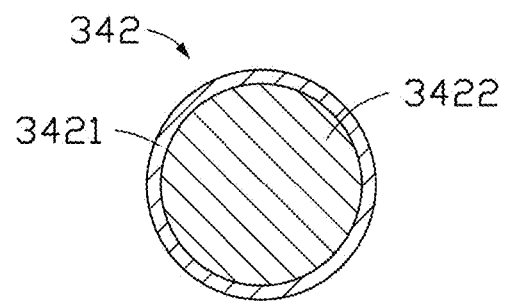
FIG. 1C is a cross-sectional of a binder of the separator of FIG. 1A.

Furthermore, referring to FIG. 1C, the first binder 342 may be a core-shell structure, that is, the first binder 342 includes a core 3422 and a shell 3421 surrounding the core 3422. The core 3422 and the shell 3421 of the first binder 342 are made of homopolymers or copolymers.

The polymerization monomers of the core 3422 of the first binder 342 are selected from the group consisting of acrylate monomer, aromatic monovinyl compound, acid anhydride, and any combination thereof. The acrylate monomers include, but are not limited to, ethyl acrylate, butyl acrylate, and ethyl methacrylate. The aromatic monovinyl compounds include, but are not limited to, styrene, chlorostyrene, fluorostyrene, and methylstyrene. The acid anhydrides include, but are not limited to, acrylic acid, methacrylic acid, and maleic acid.

The polymerization monomers of the shell 3421 of the first binder 342 are selected from the group consisting of acrylate monomers, aromatic monovinyl compounds, nitrile vinyl compounds, and any combination thereof. The acrylate monomers include, but are not limited to, methyl acrylate, ethyl acrylate, butyl acrylate, methyl methacrylate, ethyl methacrylate, and butyl methacrylate. The aromatic monovinyl compounds include, but are not limited to, ethylene, chlorostyrene, fluorostyrene, and methylstyrene. The nitrile vinyl compounds include, but are not limited to, acrylonitrile and methacrylonitrile.

In another embodiment, the first binder 342 may not have the core-shell structure. The first binder 342 is made of a homopolymer or a copolymer. The polymerization monomers of the first binder 342 include, but are not limited to, acrylic acid, acrylate, butadiene, styrene, acrylonitrile, ethylene, chlorostyrene, fluorostyrene, and propylene.

Figure 8:
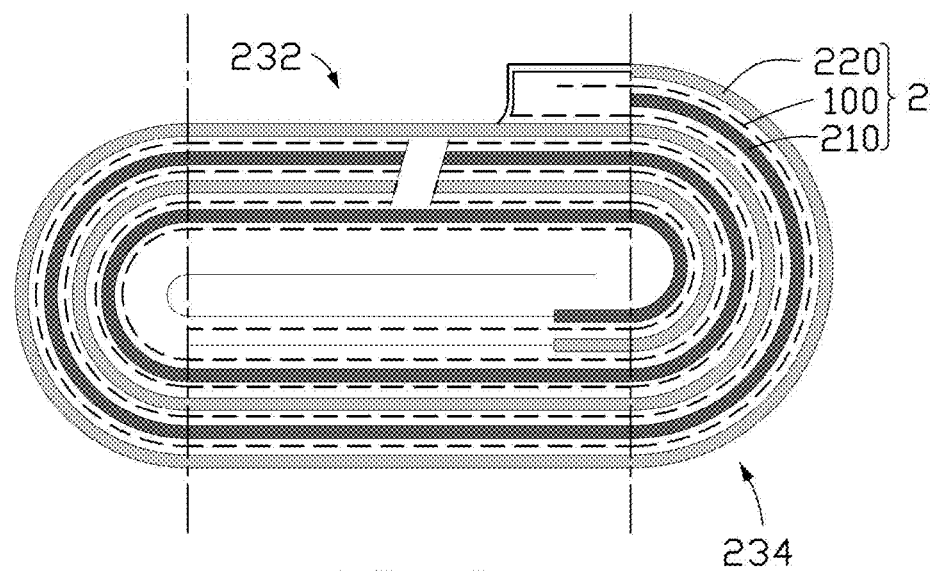
FIG. 8 is a perspective view of an embodiment of an electrode assembly according to the present disclosure.

Referring to FIG. 8, an embodiment of an electrode assembly 2 is provided according to the present disclosure. The electrode assembly 2 includes a positive electrode plate 220, a negative electrode plate 210, and the separator 100 (or the separator 200, 300, 400, 500, 600) disposed between the positive electrode plate 220 and the negative electrode plate 210. The positive electrode plate 220, the separator 100, and the negative electrode plate 210 are wound to form the electrode assembly 2.

The electrode assembly 2 includes a corner region 234 and a main region 232 beside the corner region 234. The gaps in the main region 2 disappear under the heat pressing condition during the subsequent formation procedure of the lithium-ion battery, thereby avoiding a volume energy density loss of the lithium-ion battery. The gaps in the corner region 234 still exist, which leave spaces for the expansion of the electrode plates during the charge-discharge cycling. Thus, the corner region 234 extrusion suffers from less squeezing force. Discontinuous distribution of the electrolyte in the corner region 234 is avoided, thereby leaving the ion channels unblocked.

The positive electrode plate 220 includes a positive active material and a conductive agent. The positive active material includes, but is not limited to, at least one of lithium cobaltate, lithium manganate, lithium nickel manganate, and lithium nickel cobalt manganate. The conductive agent includes, but is not limited to, at least one of carbon black, lamellar graphite, carbon nanotubes, and graphene.

Figure 9:
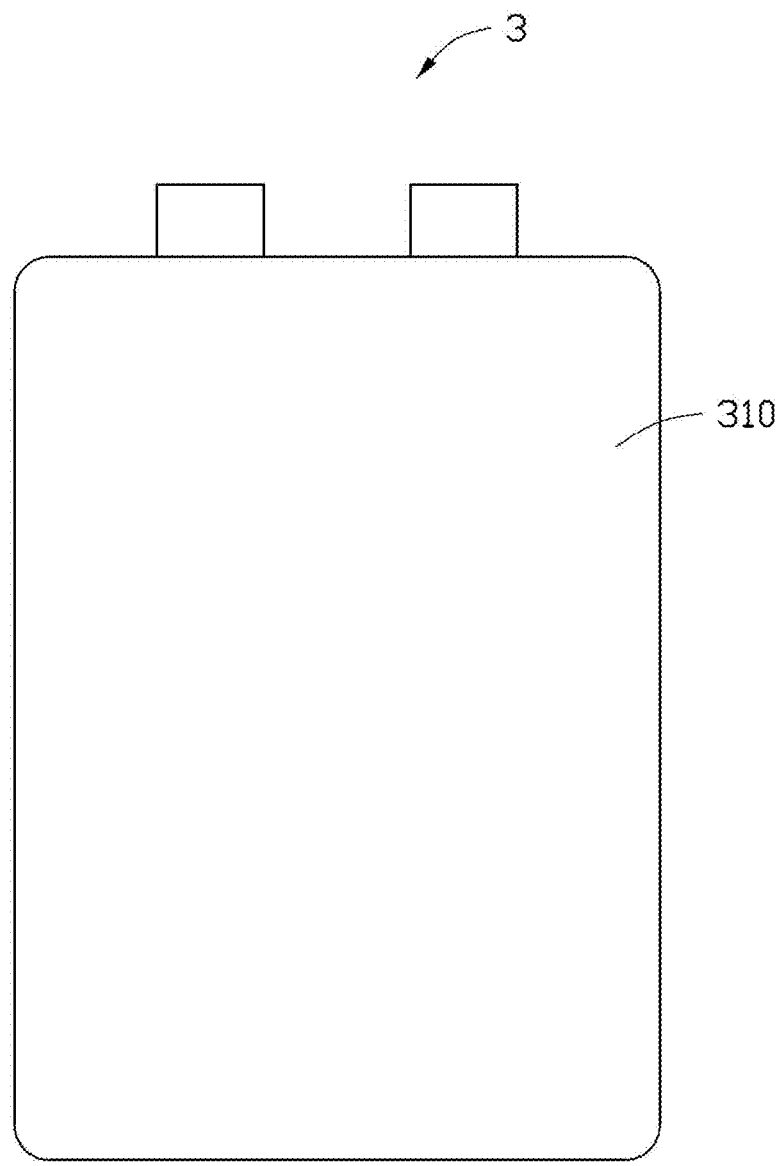
FIG. 9 is a perspective view of an embodiment of a lithium-ion battery according to the present disclosure.

Referring to FIG. 9, an embodiment of a lithium-ion battery 3 is provided according to the present disclosure. The lithium-ion battery 3 includes a housing 310, the electrode assembly 2, and an electrolyte. The electrode assembly 2 is received in the housing 310. The electrolyte is received in the housing 310. The separator 100 in the electrode assembly 2 is infiltrated with the electrolyte. Referring to FIG. 2A and FIG. 2B, the polymer particles 32 of the separator 100 swell and damage when comes in contact with the electrolyte, and then form polymers shaped like pies, continuous rings, or rings of dots (that is, a plurality of discontinuous points forming a ring structure) on a surface of the separator 100.

Figure 10:
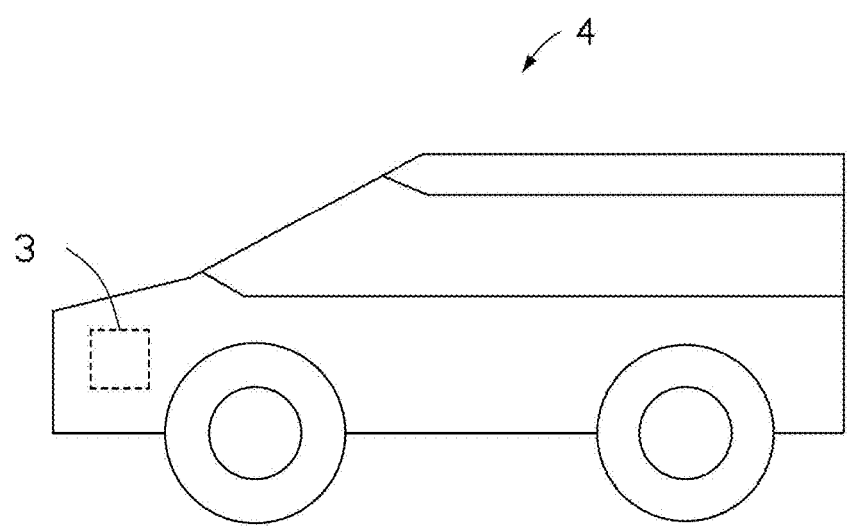
FIG. 10 is a perspective view of an embodiment of an electronic device according to the present disclosure.

Referring to FIG. 10, an embodiment of an electronic device 4 is provided according to the present disclosure. The electronic device 4 includes the lithium-ion battery 3. The electronic device 4 may be a consumer electronic product (such as a mobile communication device, a tablet computer, a notebook computer, etc.), a power tool, a drone, an energy storage device, or a power device. Referring to FIG. 10, in one embodiment, the electronic device 4 is an electric vehicle.

Implementations of the present disclosure will now be described by way of embodiments and comparative embodiments. The following embodiments are described when taking the hybrid coating layer 30 disposed on the ceramic coating layer 20 as an example. However, it can be understood that the hybrid coating layer 30, the ceramic coating layer 20, and the porous substrate 10 may be combined through various manners, which may not be limited in other embodiments.

Embodiment 1

Preparation of positive electrode plate: lithium cobaltate, conductive carbon black, and polyvinylidene fluoride in a mass ratio of 97:1.4:1.6 were dissolved in N-methylpyrrolidone (NMP) to form a positive electrode slurry. An aluminum foil was used as a positive current collector, and the positive electrode slurry was coated on the positive current collector. A positive electrode plate was obtained after drying, cold pressing, and cutting procedures.

Preparation of negative electrode plate: graphite, conductive carbon black, sodium carboxymethyl cellulose (CMC), and styrene-butadiene rubber (SBR) in a mass ratio of 96.5:1.0:1.0:1.5 were dissolved in deionized water, and then stirred in a vacuum mixer until the system becomes homogeneous, thereby obtaining a negative electrode slurry. A copper foil was used as a negative current collector, and the negative electrode slurry was coated on both surfaces of the negative current collector. A negative electrode plate was obtained after drying, cold pressing, and cutting procedures.

Separator preparation: a first binder was added to a mixer, and the polymerization monomers of the first binder included styrene, isopropyl acrylate, and acrylonitrile in a mass ratio of 80:10:10. Polymer particles were added in two steps (50% each step) and stirred. A second binder was added, and the polymerization monomers of the second binder included acrylonitrile and acrylic acid in a mass ratio of 50:50. Finally, deionized water was added and stirred to obtain a hybrid coating slurry. The hybrid coating slurry was coated on a porous substrate having a ceramic coating layer, and dried in an oven to obtain a separator with a hybrid coating layer and the ceramic coating layer. The polymerization monomers of the polymer particles were methyl methacrylate (MMA), acrylonitrile (ACN), and ethylene glycol dimethacrylate (EGDMA). The MMA, the ACN, and the EGDMA were in a mass ratio of 40:40:20. A swelling degree of the polymer particles at 85 degrees Celsius was 100%. A particle diameter D50 of the polymer particle was 2 μm. A thickness of the shell of the polymer particle was 1.5 μm. The amount of the polymer particles was 40 wt. % based on the total weight of the hybrid coating layer, the amount of the first binder was 50 wt. % based on the total weight of the hybrid coating layer, and the amount of the second binder was 10 wt. % based on the total weight of the hybrid coating layer.

Electrolyte preparation: organic solvents including ethylene carbonate (EC), ethyl methyl carbonate (EMC) and diethyl carbonate (DEC) were mixed in a dry argon atmosphere. The organic solvents EC:EMC:DEC were in a mass ratio of 30:50:20. Then, the lithium hexafluorophosphate (LiPF$_6$) was added to and dissolved in the organic solvents. After averagely mixed, an electrolyte having a lithium salt concentration of 1.15M was obtained.

Battery preparation: the separator was placed between the positive electrode plate and the negative electrode plate. The positive electrode plate, the separator, and the negative electrode plate were wound to form an electrode assembly. The electrode assembly was placed in an outer packaging casing. After the electrode assembly was dried, the electrolyte was added. A lithium-ion battery was obtained after vacuum encapsulated, stayed still, formatted, and shaped.

Embodiment 2

The preparation steps of Embodiment 2 were almost the same as those of Embodiment 1, except that the particle diameter D50 of the polymer particle was 45 μm.

Embodiment 3

The preparation steps of Embodiment 3 were almost the same as those of Embodiment 1, except that the particle diameter D50 of the polymer particle was 3 μm.

Embodiment 4

The preparation steps of Embodiment 4 were almost the same as those of Embodiment 1, except that the particle diameter D50 of the polymer particle was 8 μm.

Embodiment 5

The preparation steps of Embodiment 5 were almost the same as those of Embodiment 1, except that the particle diameter D50 of the polymer particle was 12 μm.

Embodiment 6

The preparation steps of Embodiment 6 were almost the same as those of Embodiment 1, except that the particle diameter D50 of the polymer particle was 16 μm.

Embodiment 7

The preparation steps of Embodiment 7 were almost the same as those of Embodiment 1, except that the particle diameter D50 of the polymer particle was 20 am.

Embodiment 8

The preparation steps of Embodiment 8 were almost the same as those of Embodiment 1, except that the particle diameter D50 of the polymer particle was 30 am.

Embodiment 9

The preparation steps of Embodiment 9 were almost the same as those of Embodiment 1, except that the particle diameter D50 of the polymer particle was 40 μm.

Embodiment 10

The preparation steps of Embodiment 10 were almost the same as those of Embodiment 4, except that the polymerization monomers MMA, ACN, and EGDMA of the polymer particles were in a mass ratio of 5:70:25, and the swelling degree of the polymer particles was 40%.

Embodiment 11

The preparation steps of Embodiment 11 were the same as those of Embodiment 4, except that the polymerization monomers MMA, ACN, and EGDMA of the polymer particles were in a mass ratio of 65:20:15, and the swelling degree of the polymer particles was 300%.

Embodiment 12

The preparation steps of Embodiment 12 were the same as those of Embodiment 4, except that the polymerization monomers MMA, ACN, and EGDMA of the polymer particles were in a mass ratio of 15:55:303, and the swelling degree of the polymer particles was 60%.

Embodiment 13

The preparation steps of Embodiment 13 were the same as those of Embodiment 4, except that the polymerization monomers MMA, ACN, and EGDMA of the polymer particles were in a mass ratio of 25:45:30, and the swelling degree of the polymer particles was 80%.

Embodiment 14

The preparation steps of Embodiment 14 were the same as those of Embodiment 4, except that the polymerization monomers MMA, ACN, and EGDMA of the polymer particles were in a mass ratio of 55:25:20, and the swelling degree of the polymer particles was 200%.

Embodiment 15

The preparation steps of Embodiment 15 were almost the same as those of Embodiment 4, except that the amount of the polymer particles was 5 wt. % based on the total weight of the hybrid coating layer, and the amount of the first binder was 85 wt. % based on the total weight of the hybrid coating layer.

Embodiment 16

The preparation steps of Embodiment 16 were almost the same as those of Embodiment 4, except that the amount of the polymer particles was 85 wt. % based on the total weight of the hybrid coating layer, and the amount of the first binder was 5 wt. % based on the total weight of the hybrid coating layer.

Embodiment 17

The preparation steps of Embodiment 17 were the same as those of Embodiment 4, except that the amount of the polymer particles was 10 wt. % based on the total weight of the hybrid coating layer, and the amount of the first binder was 80 wt. % based on the total weight of the hybrid coating layer.

Embodiment 18

The preparation steps of Embodiment 18 were the same as those of Embodiment 4, except that the amount of the polymer particles was 80 wt. % based on the total weight of the hybrid coating layer, and the amount of the first binder was 10 wt. % based on the total weight of the hybrid coating layer.

Embodiment 19

The preparation steps of Embodiment 19 were almost the same as those of Embodiment 4, except that the thickness of the shell of the polymer particle was 0.4 μm.

Embodiment 20

The preparation steps of Embodiment 20 were almost the same as those of Embodiment 4, except that the thickness of the shell of the polymer particle was 7 μm.

Embodiment 21

The preparation steps of Embodiment 21 were the same as those of Embodiment 4, except that the thickness of the shell of the polymer particle was 0.5 μm.

Embodiment 22

The preparation steps of Embodiment 22 were almost the same as those of Embodiment 4, except that the thickness of the shell of the polymer particle was 3 μm.

Embodiment 23

The preparation steps of Embodiment 23 were the same as those of Embodiment 4, except that the thickness of the shell of the polymer particle was 5 μm.

Embodiment 24

The preparation steps of Embodiment 24 were the same as those of Embodiment 4, except that the thickness of the shell of the polymer particle was 6 μm.

Embodiment 25

The preparation steps of Embodiment 25 were the same as those of Embodiment 4, except that no ceramic coating layer was disposed on the porous substrate. The hybrid coating layer further includes boehmite particles. The amount of the polymer particles was 55 wt. % based on the total weight of the hybrid coating layer, and the amount of the boehmite particles was 30 wt. % based on the total weight of the hybrid coating layer. The amount of the first binder was 5 wt. % based on the total weight of the hybrid coating layer. The amount of the second binder was 10% based on the total weight of the hybrid coating layer.

Embodiment 26

The preparation steps of Embodiment 26 were almost the same as those of Embodiment 4, except that no ceramic coating layer was disposed on the porous substrate. The hybrid coating layer further includes boehmite particles. The amount of the polymer particles was 65 wt. % based on the total weight of the hybrid coating layer. The amount of the boehmite particles was 20 wt. % based on the total weight of the hybrid coating layer. The amount of the first binder was 5 wt. % of the total weight of the hybrid coating layer.

The amount of the second binder was 10 wt. % based on the total weight of the hybrid coating layer.

Embodiment 27

The preparation steps of Embodiment 27 were the same as those of Embodiment 4, except that no ceramic coating layer was disposed on the porous substrate. The hybrid coating layer further includes boehmite particles. The amount of the polymer particles was 75 wt. % based on the total weight of the hybrid coating layer. The amount of the boehmite particles was 10 wt. % based on the total weight of the hybrid coating layer. The amount of the first binder was 5 wt. % based on the total weight of the hybrid coating layer. The amount of the second binder was 10 wt. % based on the total weight of the hybrid coating layer.

Comparative Embodiment 1

The preparation steps of Comparative Embodiment 1 were the same as those of Embodiment 4, except that the amount of the polymer particles was 0% based on the total weight of the hybrid coating layer. That is, no polymer particles were added. The amount of the first binder was 96 wt. % based on the total weight of the hybrid coating layer. The amount of the second binder was 4 wt. % based on the total mass of the hybrid coating layer.

Comparative Embodiment 2

The preparation steps of Comparative Embodiment 2 were the same as those of Embodiment 4, except that the amount of the polymer particles was 0% based on the total weight of the hybrid coating layer. That is, no polymer particles were added. The amount of the first binder was 84 wt. % based on the total weight of the hybrid coating layer. The amount of the second binder was 16 wt. % based on the total weight of the hybrid coating layer.

Comparative Embodiment 3

The preparation steps of Comparative Embodiment 3 were the same as those of Embodiment 4, except the preparation steps of the separator as follows:

Boehmite particles, acrylic acid, and sodium carboxymethyl cellulose in a mass ratio of 94.5:5:0.5 were added to the mixer. Deionized water was added and stirred to obtain a hybrid coating slurry. The hybrid coating slurry was coated on a porous substrate, and dried in an oven to obtain the separator.

Figure 11A:
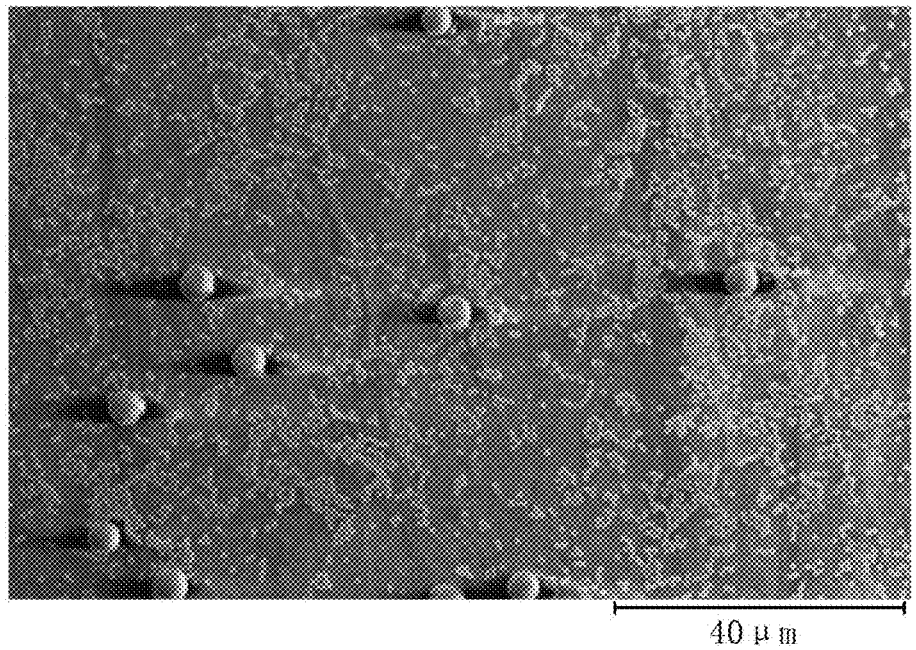
FIG. 11A is a scanning electron microscope (SEM) micrograph of a separator prepared according to Embodiment 1 of the present disclosure, showing undamaged polymer particles.
Figure 11B:
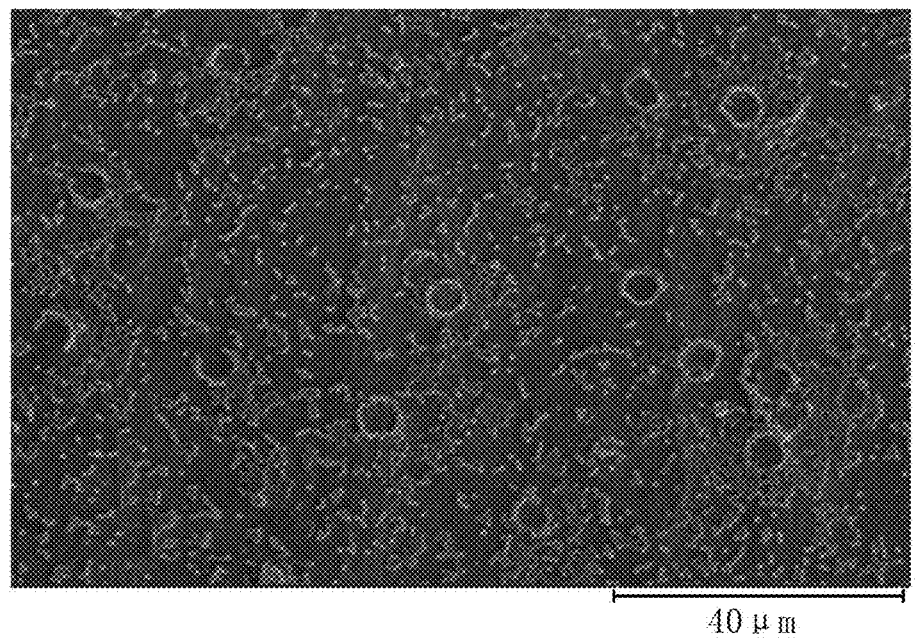
FIG. 11B is a SEM micrograph of the separator of FIG. 11A, showing the polymer particles as damaged into ring shapes.

The separator before electrolyte injection in Embodiment 1 was tested by a scanning electron microscope, and the results were shown in FIG. 11A. The polymer particles do not damage and are distributed on the surface in the shape of microspheres. The separator after being infiltrated with the electrolyte in Embodiment 1 was tested again by the scanning electron microscope, and the results were shown in FIG. 11B. The polymer particles swell and damage when comes in contact with the electrolyte, and are lied on the surface in the shape of continuous rings. The separators of other embodiments were also tested by the scanning electron microscope in the same manner, and the results were shown in Table 1.

The adhesive forces per unit between the separators prepared in Embodiments 1-27 and Comparative Embodiments 1-3 and the negative electrode plate after dry pressing were tested by a 180 degrees peel strength test. In detail, each of the separators and the negative electrode plate were cut into a sample having a size of 54.2 mm×72.5 mm, and then stacked together and heat pressed by a heat pressing device. The heat pressing was performed at a temperature of 85 degrees Celsius and a pressure of 1 Mpa for a time period of 85 s. Each sample after the heat pressing was cut into a size of 15 mm×54.2 mm. Thus, the adhesion force per unit was tested by the 180 degrees peel strength test. The results were shown in Table 1.

The charge and discharge cycling performance of the batteries prepared in Embodiments 1-27 and Comparative Embodiments 1-3 were tested. In detail, the charge-discharge cycling performance was tested under at a temperature of 12 degrees Celsius. The test procedures of the charge-discharge cycling performance test includes: (1) the batteries after assembled were stayed static for 5 minutes; (2) charged to 4.45V at constant current of 2 C, and then discharged to 0.05 C at a constant voltage; (3) stayed static for 5 min; (4) discharged to 3.0 V at a constant current of 0.2 C; (5) stayed static for 5 min; (6) charged to 4.45V at a constant current of 2 C and then discharged to 0.05 C at a constant voltage (7) stayed static for 5 min; (8) discharged to 3.0V at a constant current of 1 C; (9) stayed static for 5 min; (10) step 6 to step 9 were repeated for 49 times; (11) charged to 4.45V at a constant current of 2 C and discharged to 0.05 C at a constant voltage; (12) stayed static for 5 min; (13) discharged to 3.0V at a constant current of 0.2 C; (14) stayed still for 5 min. The steps (11) to step (14) were repeated until the capacity is reduced to be 60% with respect to the first discharge capacity or repeated for 800 times.

Then, taking the discharge capacity $D_3$ of the lithium-ion battery after the third cycle as a reference, the capacity retention rate (%) after N times of cycles is calculated as a ratio of the discharge capacity $D_N$ after N times of cycles with respect to the discharge capacity $D_3$. That is, the capacity retention rate of the lithium-ion battery after N times of cycles=$D_N/D_3$×100%. In particular, the capacity retention rate of the present disclosure is a capacity retention rate when 800 times of charge-discharge cycles were repeated in the lithium-ion battery. The calculation results were shown in Table 1.

TABLE 1

| | polymer particles in hybrid coating layer | | | | Amount of inorganic ceramic | Binder in hybrid coating layer | | Performance | | |
|---|---|---|---|---|---|---|---|---|---|---|
| | D50 (μm) | Swelling degree (%) | Thickness of shell (μm) | Amount (wt. %) | particles in hybrid coating layer (wt. %) | Amount of first binder (wt. %) | Amount of second binder (wt. %) | Adhesion force (N/m) | Shape after damaging | Capacity retention rate (%) |
| Embodiment 1 | 2 | 100 | 1.5 | 40 | 0 | 50 | 10 | 11.4 | continuous rings | 81.2 |
| Embodiment 2 | 45 | 100 | 1.5 | 40 | 0 | 50 | 10 | 3.2 | continuous rings | 82.5 |

TABLE 1-continued

| | polymer particles in hybrid coating layer | | | | Amount of inorganic ceramic particles in hybrid coating layer (wt. %) | Binder in hybrid coating layer | | Performance | | |
|---|---|---|---|---|---|---|---|---|---|---|
| | D50 (μm) | Swelling degree (%) | Thickness of shell (μm) | Amount (wt. %) | | Amount of first binder (wt. %) | Amount of second binder (wt. %) | Adhesion force (N/m) | Shape after damaging | Capacity retention rate (%) |
| Embodiment 3 | 3 | 100 | 1.5 | 40 | 0 | 50 | 10 | 10.5 | continuous rings | 88.1 |
| Embodiment 4 | 8 | 100 | 1.5 | 40 | 0 | 50 | 10 | 10.1 | continuous rings | 93.7 |
| Embodiment 5 | 12 | 100 | 1.5 | 40 | 0 | 50 | 10 | 9.1 | continuous rings | 94.1 |
| Embodiment 6 | 16 | 100 | 1.5 | 40 | 0 | 50 | 10 | 7.5 | continuous rings | 94.0 |
| Embodiment 7 | 20 | 100 | 1.5 | 40 | 0 | 50 | 10 | 6.3 | continuous rings | 91.4 |
| Embodiment 8 | 30 | 100 | 1.5 | 40 | 0 | 50 | 10 | 5.4 | continuous rings | 87.2 |
| Embodiment 9 | 40 | 100 | 1.5 | 40 | 0 | 50 | 10 | 4.1 | continuous rings | 83.6 |
| Embodiment 10 | 8 | 40 | 1.5 | 40 | 0 | 50 | 10 | 10.1 | pie | 90.3 |
| Embodiment 11 | 8 | 300 | 1.5 | 40 | 0 | 50 | 10 | 9.7 | — | 83.2 |
| Embodiment 12 | 8 | 60 | 1.5 | 40 | 0 | 50 | 10 | 10.2 | continuous rings | 92.5 |
| Embodiment 13 | 8 | 80 | 1.5 | 40 | 0 | 50 | 10 | 10 | continuous rings | 93.1 |
| Embodiment 14 | 8 | 200 | 1.5 | 40 | 0 | 50 | 10 | 9.8 | rings of dots | 88.6 |
| Embodiment 15 | 8 | 100 | 1.5 | 5 | 0 | 85 | 10 | 11.6 | continuous rings | 82.6 |
| Embodiment 16 | 8 | 100 | 1.5 | 85 | 0 | 5 | 10 | 3.8 | continuous rings | 91.5 |
| Embodiment 17 | 8 | 100 | 1.5 | 10 | 0 | 80 | 10 | 10.3 | continuous rings | 85.1 |
| Embodiment 18 | 8 | 100 | 1.5 | 80 | 0 | 10 | 10 | 6.7 | continuous rings | 92.9 |
| Embodiment 19 | 8 | 100 | 0.4 | 40 | 0 | 50 | 10 | 11.3 | continuous rings | 86.1 |
| Embodiment 20 | 8 | 100 | 7 | 40 | 0 | 50 | 10 | 5.2 | continuous rings | 85.8 |
| Embodiment 21 | 8 | 100 | 0.5 | 40 | 0 | 50 | 10 | 10.5 | continuous rings | 91.1 |
| Embodiment 22 | 8 | 100 | 3 | 40 | 0 | 50 | 10 | 9.3 | continuous rings | 93.6 |
| Embodiment 23 | 8 | 100 | 5 | 40 | 0 | 50 | 10 | 8.1 | continuous rings | 94.1 |
| Embodiment 24 | 8 | 100 | 6 | 40 | 0 | 50 | 10 | 7.5 | continuous rings | 93.3 |
| Embodiment 25 | 8 | 100 | 1.5 | 55 | 30 | 5 | 10 | 3.1 | continuous rings | 90.1 |
| Embodiment 26 | 8 | 100 | 1.5 | 65 | 20 | 5 | 10 | 2.9 | continuous rings | 89.2 |
| Embodiment 27 | 8 | 100 | 1.5 | 75 | 10 | 5 | 10 | 2.1 | continuous rings | 87.8 |
| Comparative Embodiment 1 | — | — | — | 0 | 0 | 96 | 4 | 12.4 | — | 75.1 |
| Comparative Embodiment 2 | — | — | — | 0 | 0 | 84 | 16 | 9.5 | — | 76.3 |
| Comparative Embodiment 3 | — | — | — | — | 79.38 | 4.62 | 16 | 0 | — | 70.8 |

From Table 1, compared to Comparative Embodiments 1 to 3, since the polymer particles are included in the hybrid coating layers of the separators of Embodiments 1 to 27, the batteries of Embodiments 1 to 27 have higher capacity retention rate.

Under the condition that the polymer particles are included in the hybrid coating layers of the separators, the particle diameter D50 of the polymer particle affect the performances of the batteries. Compared with Embodiments 3 to 9, the particle diameter D50 of the polymer particle of Embodiment 1 is very small, and the gaps formed between the separator and the electrode plates are also very small, which results in lower capacity retention rate of the lithium-ion battery of Embodiment 1. The particle diameter D50 of the polymer particle of Embodiment 2 is very large, which affects the adhesion performance of the hybrid coating layer. Therefore, the lithium-ion battery of Embodiment 2 has lower adhesion force and lower capacity retention rate.

Moreover, the swelling degree of the polymer particles also affects the performance of the lithium-ion battery. Compared with the polymer particles of Embodiments 4, 12, and 13 being shaped like continuous or discontinuous rings after damaging, the polymer particles of Embodiment 10 have a smaller swelling degree, and do not damage to pieces but only collapse into pie-shapes lying on the surface of the separator. Thus, a lower capacity retention rate of the lithium-ion battery is obtained. The capacity retention rate of the lithium-ion battery of Embodiment 14 is lower than that of Embodiments 4, 12, and 13. This is because that the swelling degree of the hollowness of Embodiment 14 is 200%, which is at the critical point at which the polymer particles may be dissolved in the electrolyte. Thus, the polymer particles may be partially dissolved in the electrolyte, so that the capacity retention rate of the lithium-ion battery is reduced. The swelling degree of the polymer particles of Embodiment 11 is very large, and the polymer particles are partially dissolved in the electrolyte, resulting in a low capacity retention rate of the lithium-ion battery.

The amount of the polymer particles based on the total weight of the hybrid coating layer also affects the performance of the lithium-ion battery. Compared to Embodiments 4, 17, and 18, the polymer particles of Embodiment 15 have a lower amount. Smaller gaps are formed in the corner region, so the problem of discontinuous distribution of the electrolyte in the corner region is totally avoided, resulting in a lower capacity retention rate. The amount of the polymer particles in Embodiment 16 is very high, resulting in a smaller amount of the binder and a lower adhesion force.

The thickness of the shell of the polymer particle also affects the performance of the lithium-ion battery. Compared with Embodiments 4, 21 and 24, the thickness of the shell of the polymer particle of Embodiment 19 is very small, which results in a lower capacity retention rate. The thickness of the shell of the polymer particle of Embodiment 20 is very large, and the polymer particle can swell and damage when comes in contact with the electrolyte, resulting in a lower capacity retention rate.

Compared to Embodiment 4, since the ceramic coating layer was omitted in Embodiments 25 to 27 and a certain amount of inorganic ceramic particles were added to the hybrid coating layer, the amount of the binder based on the total weight of the hybrid coating layer was reduced, thus affecting the adhesion performance of the hybrid coating layer. Therefore, compared to Embodiment 4, the batteries of Embodiments 25 to 27 have a lower adhesion force and a lower capacity retention rate.

Although the embodiments of the present disclosure have been shown and described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. A separator, comprising:
   a porous substrate;
   a hybrid coating layer, wherein the hybrid coating layer comprises a plurality of polymer particles and a binder, each polymer particle comprises a shell and a cavity defined in the shell, and the each polymer particle swells and damages when comes in contact with an electrolyte; and
   a ceramic coating layer coated on at least one surface of the porous substrate, wherein the hybrid coating layer is disposed on a surface of the ceramic coating layer and/or a surface of the porous substrate not coated with the ceramic coating layer.

2. The separator of claim 1, wherein the hybrid coating layer further comprises an inorganic ceramic particle.

3. The separator of claim 1, wherein a particle diameter D50 of the each polymer particle is in a range of 3 μm to 40 μm.

4. The separator of claim 1, wherein a thickness of the shell of the each polymer particle is in a range of 0.5 μm to 6 μm.

5. The separator of claim 1, wherein the each polymer particle has a swelling degree of 60% to 200% in the electrolyte.

6. The separator of claim 1, wherein the shell of the each polymer particle is a homopolymer or a copolymer, and polymerization monomers of the shell of the each polymer particle are selected from the group consisting of methyl acrylate, methyl methacrylate, vinyl methacrylate, ethylene glycol dimethacrylate, acrylonitrile, and any combination thereof.

7. The separator of claim 1, wherein an amount of the plurality of polymer particles is 10 wt. % to 80 wt. % based on a total weight of the hybrid coating layer, and an amount of the binder is 20 wt. % to 90 wt. % based on the total weight of the hybrid coating layer.

8. The separator of claim 1, wherein the binder comprises a first binder and a second binder, a mass ratio of the first binder to the second binder is (85%-95%):(5%-15%), and a particle diameter D50 of the first binder is in a range of 0.3 μm to 0.5 μm.

9. The separator of claim 8, wherein the first binder has a core and a shell surrounding the core, the core and the shell of the first binder are made of homopolymers or copolymers; wherein polymerization monomers of the core are selected from the group consisting of acrylate monomers, aromatic monovinyl compounds, acid anhydride, and any combination thereof, and polymerization monomers of the shell of the first binder are selected from the group consisting of acrylate monomers, aromatic monovinyl compounds, nitrile vinyl compounds, and any combination thereof.

10. The separator of claim 8, wherein the first binder is made of a homopolymer or a copolymer, and polymerization monomers of the first binder are selected from the group consisting of acrylic acid, acrylate, butadiene, styrene, acrylonitrile, ethylene, chlorostyrene, fluorostyrene, propylene, and any combination thereof.

11. A lithium-ion battery, comprising:
    an electrolyte; and
    an electrode assembly comprising:
    a separator comprising a porous substrate and a hybrid coating layer, wherein the hybrid coating layer comprises a polymer and a binder, the polymer is formed by a plurality of polymer particles, and the plurality of polymer particles swell and damage when comes in contact with the electrolyte, and the polymer particle comprises a shell and a cavity defined in the shell, wherein the separator further comprises a ceramic coating layer coated on at least one surface of the porous substrate, and the hybrid coating layer is disposed on a surface of the ceramic coating layer and/or a surface of the porous substrate not coated with the ceramic coating layer.

12. The lithium-ion battery of claim 11, wherein the hybrid coating layer further comprises an inorganic ceramic particle.

13. The lithium-ion battery of claim 11, wherein a particle diameter D50 of the each polymer particle is in a range of 3 μm to 40 μm.

14. The lithium-ion battery of claim 11, wherein a thickness of the shell of the each polymer particle is in a range of 0.5 μm to 6 μm.

15. The lithium-ion battery of claim 11, wherein the each polymer particle has a swelling degree of 60% to 200% in the electrolyte.

16. The lithium-ion battery of claim 11, wherein the shell of the each polymer particle is a homopolymer or a copolymer, and polymerization monomers of the shell of the each polymer particle are selected from the group consisting of methyl acrylate, methyl methacrylate, vinyl methacrylate, ethylene glycol dimethacrylate, acrylonitrile, and any combination thereof.

17. The lithium-ion battery of claim 11, wherein an amount of the plurality of polymer particles is 10 wt. % to 80 wt. % based on a total weight of the hybrid coating layer, and an amount of the binder is 20 wt. % to 90 wt. % based on the total weight of the hybrid coating layer.

18. An electronic device, comprising:
a lithium-ion battery comprising:
an electrolyte; and
an electrode assembly comprising:
a separator comprising a porous substrate and a hybrid coating layer, wherein the hybrid coating layer comprises a polymer and a binder, the polymer is formed by a plurality of polymer particles and the plurality of polymer particles swell and damage when comes in contact with the electrolyte, and the polymer particle comprises a shell and a cavity defined in the shell, wherein the separator further comprises a ceramic coating layer coated on at least one surface of the porous substrate, and the hybrid coating layer is disposed on a surface of the ceramic coating layer and/or a surface of the porous substrate not coated with the ceramic coating layer.

* * * * *